March 18, 1930. A. MAZAK 1,751,346
FERTILIZER DISTRIBUTOR
Filed Aug. 22, 1928 3 Sheets-Sheet 1
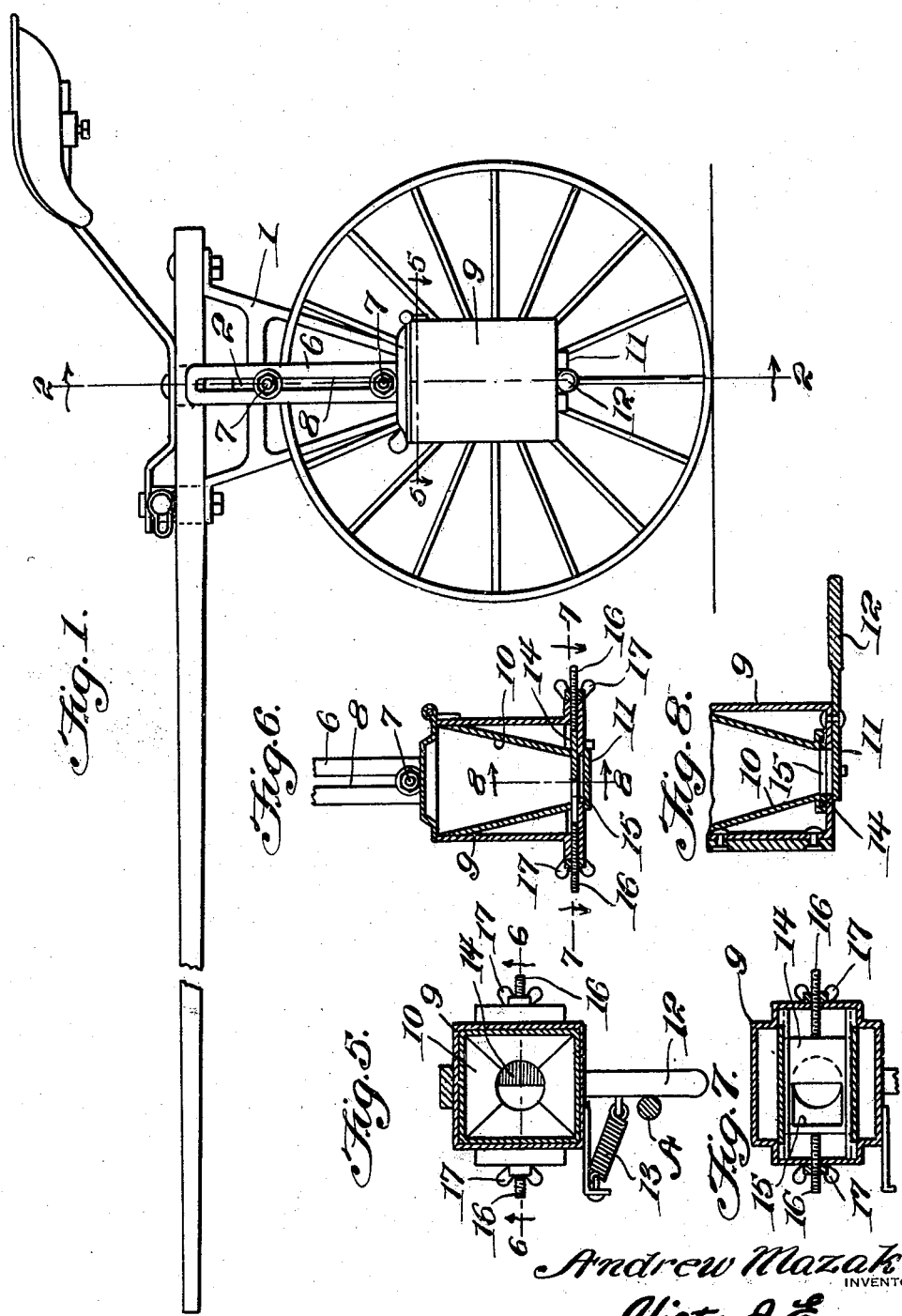

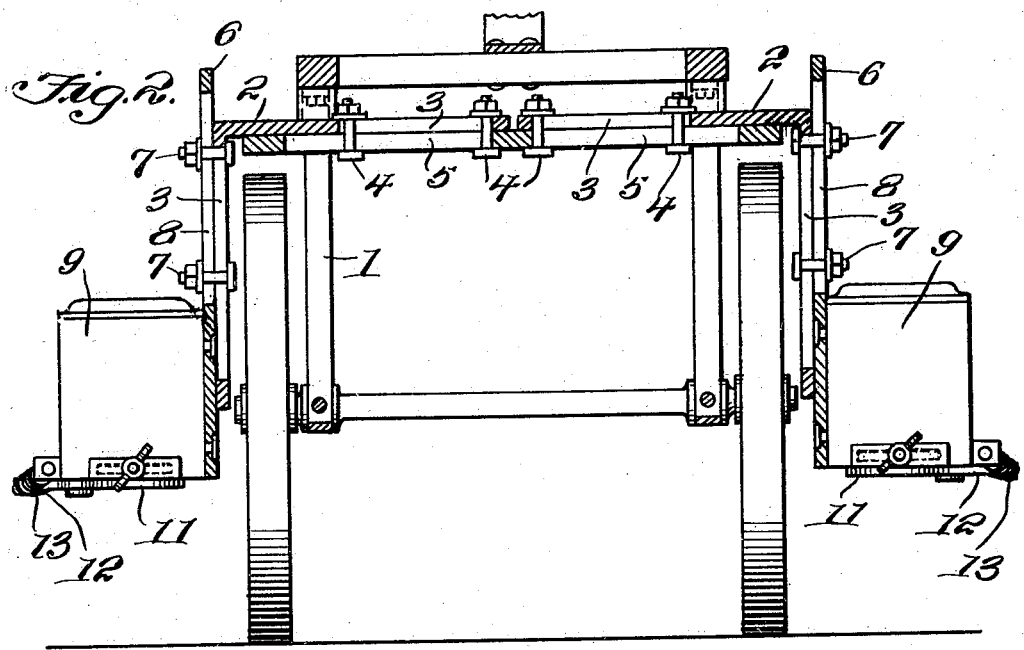
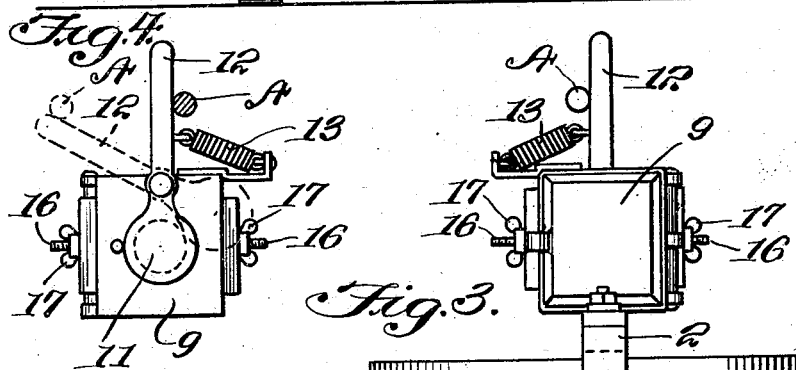
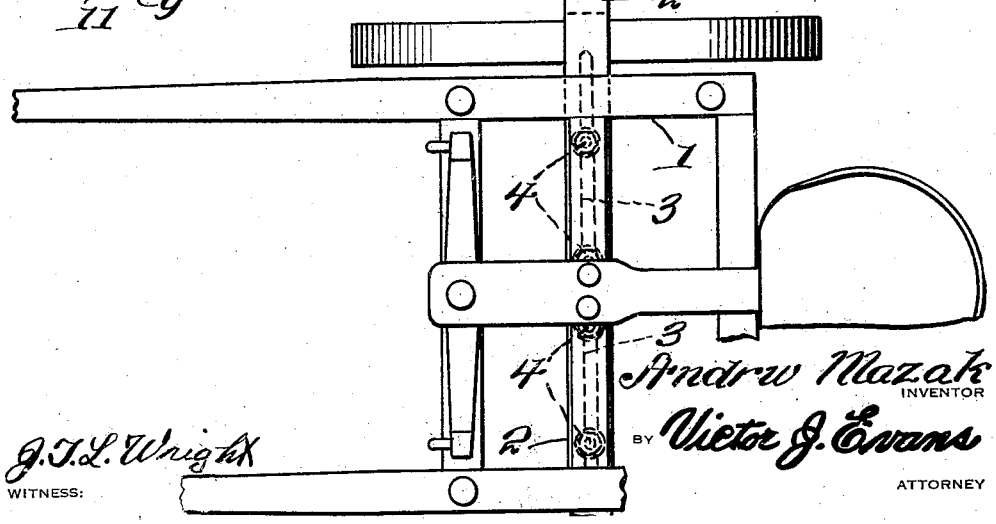

March 18, 1930. A. MAZAK 1,751,346
FERTILIZER DISTRIBUTOR
Filed Aug. 22, 1928   3 Sheets-Sheet 3
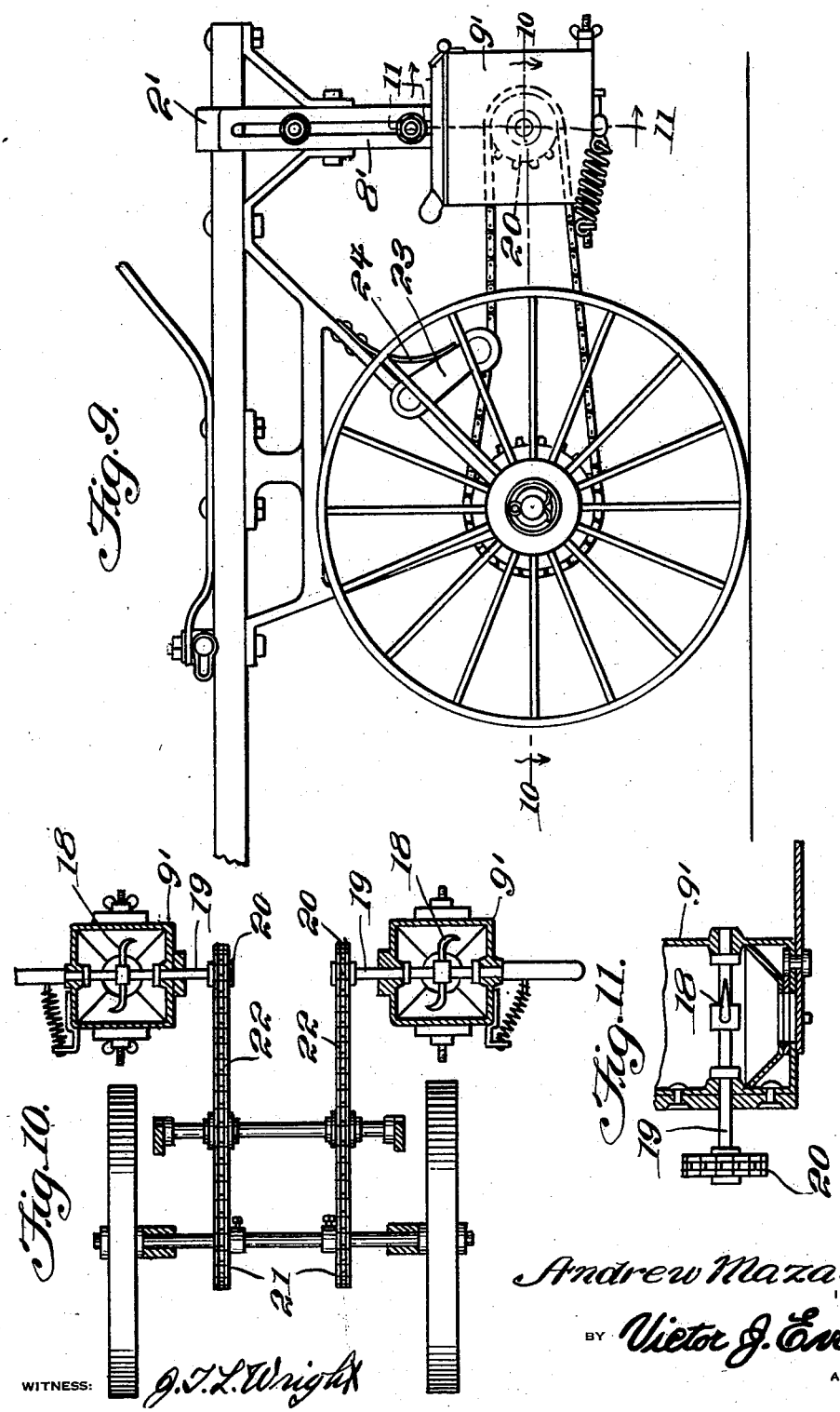

Patented Mar. 18, 1930

1,751,346

UNITED STATES PATENT OFFICE

ANDREW MAZAK, OF PRINCE GEORGE, VIRGINIA

FERTILIZER DISTRIBUTOR

Application filed August 22, 1928. Serial No. 301,342.

This invention relates to a fertilizer distributor, the general object of the invention being to provide means for operating the feed device of the fertilizer by the plants to be fertilized so that as the machine is drawn along a row of plants, the fertilizer will be dropped adjacent each plant so that it will be taken up by the roots of the plant.

Another object of the invention is to so form the device that it may be adjusted for different sizes of plants and also for different widths of rows.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the implement.

Figure 2 is a section on line 2—2 of Figure 1.

Figure 3 is a partial plan view.

Figure 4 is a bottom plan view of the distributing means.

Figure 5 is a section on line 5—5 of Figure 1.

Figure 6 is a section on line 6—6 of Figure 5.

Figure 7 is a section on line 7—7 of Figure 6.

Figure 8 is a section on line 8—8 of Figure 6.

Figure 9 is an elevation showing a modification.

Figure 10 is a section on line 10—10 of Figure 9.

Figure 11 is a section on line 11—11 of Figure 9.

In these views, 1 indicates a two wheel cart or sulky, to each side of which is fastened an angle bar 2. One arm of each bar extends downwardly adjacent the outer face of each wheel of the vehicle. Each arm of the bar is provided with an elongated slot 3. Bolts 4 pass through the slot in the horizontal arm of each member 2 and through a slot 5 formed in the supporting part of the sulky frame so that the bars 2 can be adjusted toward and away from the wheels so that the device can be used in fields where the distance between the rows varies. A vertical bar 6 is adjustably connected with the vertical arm of each bar 3 through means of the bolts 7 which pass through the slot 3 and through the slot 8 in the bar 6. A casing 9 is fastened to the lower end of each bar 8.

A tapered member 10 is arranged in each casing 9 for receiving the fertilizer and the open end of each member 10 is controlled by a gate or valve 11 of paddle shape, the stem 12 of which is pivoted to a bottom part of the casing adjacent the junction of the stem with the part 11, with the stem projecting well beyond the casing so that it will engage the plants, such as cornstalks A, which will cause the valve to be moved to open position to permit some of the fertilizer to drop from the container on to the ground. A spring 13 normally holds the valve in closed position.

In order to regulate the amount of material passing from the container, I provide a slide 14 in the casing which has a hole 15 therein for registering with the hole in the member 10. The slide is adjusted by means of the threaded shafts 16 attached to the ends of the slide and passing through portions of the casing, the projecting parts receiving the wing nuts 17 so that by turning these nuts, the slide can be moved to bring more or less of the opening 15 in register with the opening in the bottom of the member 10.

From the foregoing, it will be seen that when the implement is driven along the space between two rows of plants, the projecting stems of the valve members will engage the plants of the two rows so that the valves will be opened and fertilizer deposited adjacent the roots of the plants. After the stem passes a plant, the spring 13 will close the valve again. As will be seen, the device can be adjusted for different widths of rows and also for different sizes of plants by adjusting the casings 9 vertically.

In the modification shown in Figures 9, 10 and 11, the supporting members 2' are so placed on the frame that they are in rear of the ground wheels of the sulky, so that the casings 9' are arranged in rear of the wheels, these casings being vertically adjustable on the members 2' through means of the slotted bars 8', as before described.

In this modification, I provide agitators 18 in each casing for agitating the fertilizer therein, these agitators being connected to a shaft 19 which passes through the casing and is suitably journaled in the sides thereof. The outer end of each shaft has fastened thereto a sprocket 20 and sprockets 21 are fastened to the axle which carries the ground wheels of the sulky. Chains 22 pass over the sprockets so that the agitator shafts are rotated from the ground wheels. A tightener device 23 is pivotally connected with the frame of the sulky and its rollers are pressed against the chains by the springs 24. In other respects, this form of the invention is similar to that before described.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. An implement of the character described comprising a wheeled frame, a casing supported by the frame at the outside of each wheel and having an opening in its bottom, means for adjusting the casing vertically with relation to the ground, means for adjusting the casing horizontally with relation to the frame, a gate valve pivoted on the bottom of the casing, a spring normally holding the valve in a position to close said opening, and a plant actuated bar forming a continuity of said valve and lying in the same plane therewith, whereby when said arm engages the plant the valve will be directly operated and moved to an open position.

2. An implement of the character described comprising a wheeled frame, an inverted substantially U-shaped auxiliary frame supported by the wheeled frame and including a horizontally disposed slotted bar, and complementary sections of the U-shaped frame, said sections being adjustable transversely of the implement on said horizontally disposed bar, vertically disposed adjustable bars carried by the parallel portions of the U-shaped frame, a casing supported by the lower end of each vertical bar, said casing having an opening in the bottom thereof, a gate valve pivoted on the bottom of the casing, a spring normally holding the valve in a position to close the opening, and a plant actuated arm forming a continuity of said valve and projecting beyond the casing, whereby said arm will engage a plant and directly move the valve to an open position.

In testimony whereof I affix my signature.

ANDREW MAZAK.